CARRIE M. NEWELL.
CULINARY STEAMER.
No. 178,184. Patented May 30, 1876.
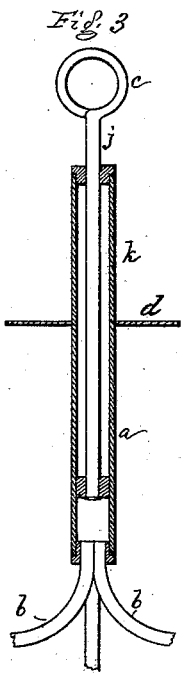
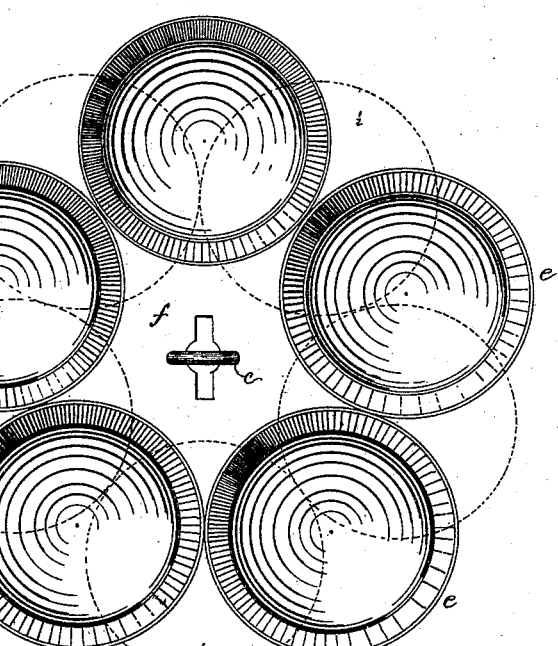
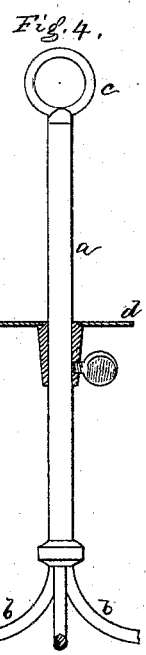
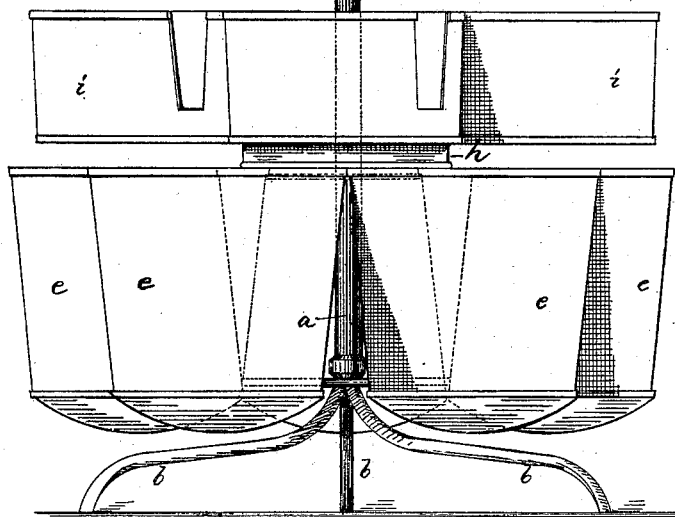
Witnesses.
L. H. Latimer,
W. J. Pratt.
Inventor.
Carrie M. Newell
per Crosby & Gregory
Attys.

UNITED STATES PATENT OFFICE.

CARRIE M. NEWELL, OF BOSTON, MASSACHUSETTS.

IMPROVEMENT IN CULINARY STEAMERS.

Specification forming part of Letters Patent No. 178,184, dated May 30, 1876; application filed May 5, 1876.

*To all whom it may concern:*

Be it known that I, CARRIE M. NEWELL, of Boston, in the county of Suffolk and State of Massachusetts, have invented an Improvement in Apparatus for Steaming Puddings, &c., of which the following is a specification:

This invention relates to an apparatus for steaming puddings, apple-dumplings, custards, or other things for food purposes; and the invention consists in a stand adapted to be placed in a kettle, in combination with one or more series of pans carried by and movable with the stand.

Figure 1 represents my improved apparatus in top view, and in Fig. 2 in side view; and Figs. 3 and 4 represent modifications of the stand.

The stand is composed of an upright, $a$, and feet $b$, the stand being provided at top with a handle, $c$, by which to lift the apparatus. The upright is provided with a rest, $d$, adapted to support the series of pudding or dumpling pans $e$, made from tin, and connected by a disk, $f$, provided with a hole shaped to receive the upright portion of the handle when the disk is in one position, and to retain the disk on the handle when in another position.

The pans are placed on the stand, and are filled with batter, or whatever is to be cooked by the action of the steam, and the stand and filled pans are then placed in a suitable kettle, the water in which is at about to the level of the lower portions of the pans, and a cover being placed on the kettle, the steam generated by the evaporating water rises about the pudding-pans, and quickly and thoroughly cooks the contents of the pans.

I may at the same time steam other articles besides puddings or apple-dumplings—as, for instance, cup-custard, it being placed in small cups; and to do this I provide a second series of pans, in this instance shown as slotted, to receive the handles of the cups. This series of pans is connected by a disk, slotted to receive the stand, and with a prolonged hub, $h$, forming a rest for the series of pans, and adapted to rest on the tops of the series of pans below it, or on the rest $d$.

To steam brown-bread, or whenever desired, the pans $e$ will be provided with covers.

After the articles are steamed the stand and pans may be lifted from the kettle, and the pans may be removed from the stand and inverted to remove their contents, and they may be refilled or other pans be again placed on the stand.

The stand-handle may be made in any usual way, and the rest be positively secured thereto; or it may be attached by a set-screw, as shown in Fig. 4, so as to be adjustable up or down, to adapt the rest to the depth of the lower pans; or, for a deep kettle, and when more than two rows of pans are used, the handle may be made extensible, as in Fig. 3, the part $j$ being free to slide in the tubular part $k$.

This apparatus is specially useful for steaming apple-dumplings, and such puddings as are usually cooked by boiling, and, being kept separate and out of the water, the dumplings are perfectly cooked; but aside from this special use, it may be used to contain a variety of other things to be cooked by steam.

The apparatus may be used in connection with an ordinary kettle. It is made of tin—a metal quickly heated and easily cleansed.

I claim—

1. The stand $a\ b\ c$, provided with rest $d$, in combination with the series of connected pans $e$, and all removable together from the stand, substantially as described.

2. The stand and pans $i$, slotted to receive the handles of cups, in combination with the stand, substantially as described.

3. The stand and pans $e$, in combination with a series of pans, $i$, and a hub, $h$, to retain the pans $i$ above the pans $e$, substantially as described.

In testimony whereof I have signed my name to this specification in the presence of two subscribing witnesses.

MRS. CARRIE M. NEWELL.

Witnesses:
G. W. GREGORY,
W. J. PRATT.